(12) United States Patent
Oniki

(10) Patent No.: US 8,842,140 B2
(45) Date of Patent: Sep. 23, 2014

(54) LIQUID CRYSTAL DISPLAY DEVICE HAVING MULTI-SPEED DRIVE MODES AND IMAGE INTERPOLATION

(75) Inventor: Motoyuki Oniki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 184 days.

(21) Appl. No.: 13/389,415

(22) PCT Filed: Aug. 6, 2010

(86) PCT No.: PCT/JP2010/063348
§ 371 (c)(1),
(2), (4) Date: Mar. 8, 2012

(87) PCT Pub. No.: WO2011/016541
PCT Pub. Date: Feb. 10, 2011

(65) Prior Publication Data
US 2012/0162289 A1    Jun. 28, 2012

(30) Foreign Application Priority Data

Aug. 7, 2009  (JP) .................................. 2009-184138

(51) Int. Cl.
G09G 5/10      (2006.01)
G09G 3/34      (2006.01)
G02F 1/1335    (2006.01)
H04N 7/01      (2006.01)

(52) U.S. Cl.
CPC ............ *G09G 3/342* (2013.01); *G09G 2310/08* (2013.01); *G09G 2310/024* (2013.01); *G09G 2340/0435* (2013.01); *G02F 2001/133601* (2013.01); *G09G 2320/0261* (2013.01); *H04N 7/0132* (2013.01); *G09G 2310/0237* (2013.01); *G02F 1/133602* (2013.01); *G02F 1/133603* (2013.01)
USPC ......................................................... 345/690

(58) Field of Classification Search
USPC ................................................. 345/690, 102
See application file for complete search history.

(56) References Cited

U.S. PATENT DOCUMENTS

2002/0015104 A1*   2/2002  Itoh et al. ...................... 348/459
2002/0154088 A1   10/2002  Nishimura
(Continued)

FOREIGN PATENT DOCUMENTS

EP    1 255 241 A1    11/2002
JP    2005-128561     5/2005
(Continued)

OTHER PUBLICATIONS

European Search Report for corresponding European Patent Application No. 10806540.0, dated Jan. 10, 2013.

*Primary Examiner* — William Boddie
*Assistant Examiner* — Bipin Gyawali
(74) *Attorney, Agent, or Firm* — Birch, Stewart, Kolasch & Birch, LLP

(57) ABSTRACT

To provide a liquid crystal display device capable of reducing the occurrence of a multi-contour in the display of a moving image to the minimum, the cycle of execution of an intermittent lighting operation in backlight scanning and the cycle of a vertical synchronization signal are made equal when an interpolation image insertion mode in which an interpolation image signal generated on the basis of two or more continuous frame images is inserted between frames and written into a liquid crystal panel is executed, and the cycle of the execution of the intermittent lighting operation in the backlight scanning is made longer than the cycle of the vertical synchronization signal (or the backlight scanning is disabled) when an overlapped image output mode in which the same frame image is written into the liquid crystal panel continuously n times is executed.

5 Claims, 9 Drawing Sheets

(56) References Cited

U.S. PATENT DOCUMENTS

| | | |
|---|---|---|
| 2005/0259064 A1* | 11/2005 | Sugino et al. .................. 345/102 |
| 2008/0069478 A1* | 3/2008 | Ohwaki et al. ................. 382/300 |
| 2008/0158212 A1* | 7/2008 | Maruyama et al. ........... 345/208 |
| 2008/0284719 A1 | 11/2008 | Yoshida |
| 2008/0284931 A1 | 11/2008 | Kimura |
| 2009/0080789 A1 | 3/2009 | Shoji |
| 2009/0122207 A1 | 5/2009 | Inoue et al. |

FOREIGN PATENT DOCUMENTS

| | | |
|---|---|---|
| JP | 3994997 | 8/2007 |
| JP | 2008-76644 A | 4/2008 |
| JP | 2008-165161 | 7/2008 |
| JP | 2008-287118 A | 11/2008 |
| RU | 2106012 C1 | 2/1998 |
| WO | WO 2004/053826 A1 | 6/2004 |

* cited by examiner

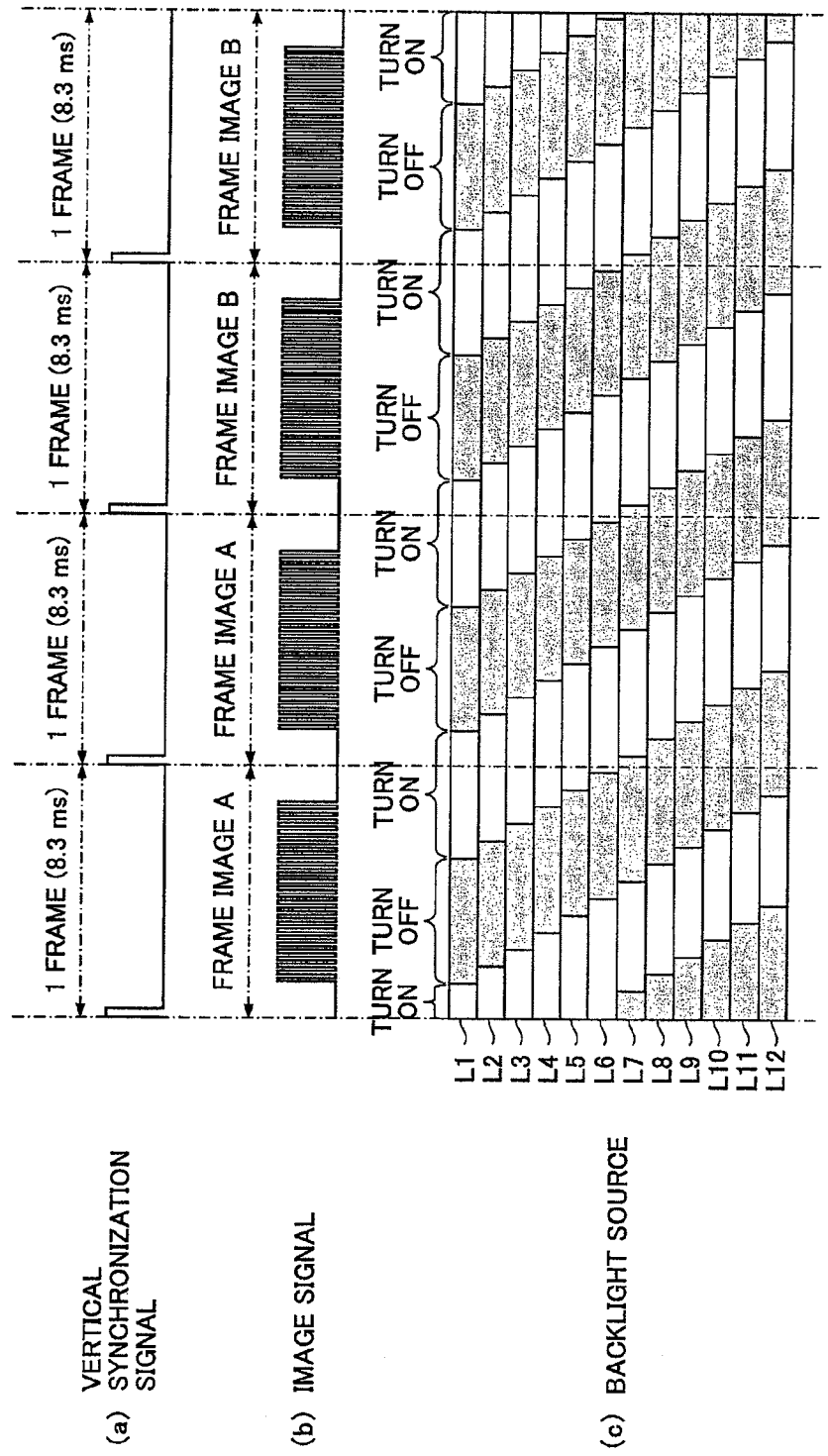

LIQUID CRYSTAL DISPLAY DEVICE HAVING MULTI-SPEED DRIVE MODES AND IMAGE INTERPOLATION

TECHNICAL FIELD

The present invention relates to a liquid crystal display device having a liquid crystal panel and a backlight source, and, more particularly, to a technique for preventing motion blur in displaying moving images by intermittently turning on backlight source.

BACKGROUND ART

Recently, a liquid crystal display device having a liquid crystal panel and a backlight source has come into wide use as a TV set, display device, etc. The liquid crystal display device poses a problem of motion blur occurring in displaying moving images when operated by a hold-type drive method of constantly turning on the backlight source.

FIG. 7(a) depicts a visually recognized image F2 that is recognized by a viewer when an original image F1 moves on a liquid crystal display panel driven by a hold-type drive method of constantly turning on a backlight source. As depicted in FIG. 7(a), in a state of hold-type drive, motion blur due to an afterimage persisting on the human retina is created on the visually recognized image F2 that is recognized by the viewer when the original image F1 moves.

A conventional method is known as a method of preventing motion blur occurring in displaying moving images by intermittently turning on a backlight source to carry out pseudo impulse drive (see, e.g., patent document 1.)

Particularly, as disclosed in patent document 1, a backlight scanning may be executed in such a way that a plurality of light sources corresponding to a plurality of display areas in a vertical direction of a liquid crystal panel are intermittently turned on in sequence in synchronization with image writing in the display areas.

For example, a backlight source 31 depicted in FIG. 2 includes rows of LED light source groups L1 to L12 corresponding to a plurality of display areas in the vertical direction of a liquid crystal panel. Each of the LED light source groups L1 to L12 has a plurality of horizontally arranged LED light sources 31a.

FIG. 8 depicts an example of the result of execution of the backlight scanning by the backlight source 31. As shown in FIG. 8, in the backlight scanning, the LED light source groups L1 to L12 are intermittently turned on in sequence to realize pseudo impulse drive.

More specifically, in the backlight scanning, when a vertical synchronization signal (FIG. 8(a)) is received, the first horizontal synchronization signal is then received, and a time for writing an image signal in the first line arrives (FIG. 8(b)), the light source group L1 is turned off for about 8.3 ms and then is turned on for about 8.3 ms (FIG. 8(c)). When writing an image in an area corresponding to the LED light source L1 is finished and a time for writing an image in an area corresponding to the LED light source L2 arrives, the light source group L2 is turned off for about 8.3 ms and then is turned on for about 8.3 ms (FIG. 8(c)). In the same manner, other LED light source groups L3 to L12 are each turned off for about 8.3 ms and then are turned on for about 8.3 ms (FIG. 8(c)) when a time for writing an image in each of areas corresponding to the LED light source groups L3 to L12 arrives.

FIG. 7(b) depicts a visually recognized image F3 that is recognized by the viewer when the original image F1 moves on the liquid crystal display panel as the backlight scanning is executed. As shown in FIG. 7(b), the backlight scanning reduces the motion blur of the visually recognized image F3 recognized by the viewer to allow less motion blur than in a case of the hold-type drive (FIG. 7(a)).

A technology called multi-speed response liquid crystal technology has become widely known in recent years, according to which the frame frequency (60 Hz) of TV broadcasting video is increased up to an n-fold frequency (120 Hz, 240 Hz, etc.) to enable multi-speed response display. This technology shortens a display time of 1 frame, thus reduces image persistence feelings.

In this technology, as disclosed in patent document 2, a method of generating an interpolation image based on two or more consecutive frame images and inserting the interpolation image between frames to be displayed (equivalent to a first multi-speed drive mode, which is hereinafter referred to as "interpolation image insertion mode") and a method of displaying the same frame image n times in a row (equivalent to a second multi-speed drive mode, which is hereinafter referred to as "overlapped image output mode") are used to increase the frame frequency to an n-fold frequency.

To increase the frame frequency to an n-fold frequency, the frequencies of a vertical synchronization signal and a horizontal synchronization signal are increased to n-fold frequencies. As depicted in FIG. 9, for example, in the overlapped image output mode, a series of the backlight scanning are executed to display each of frame images A, A, B, and B, during which the execution cycle of the intermittent turning-on action in the backlight scanning become a twofold cycle.

FIG. 7(c) depicts a visually recognized image F4 that is recognized by the viewer when the original image F1 moves on the liquid crystal display panel as the interpolation image insertion mode is executed. FIG. 7(d) depicts a visually recognized image F5 that is recognized by the viewer when the original image F1 moves on the liquid crystal display panel as the overlapped image output mode is executed.

As shown in FIG. 7(c), in the interpolation image insertion mode, an interpolation image based on preceding and following frame images is inserted between frames. As a result, smooth moving image display is realized and no deteriorated form of a multi-contour due to multi-speed drive in the backlight scanning is observed.

PRIOR ART DOCUMENTS

Patent Documents

Patent document 1: Japanese Patent No. 3994997
Patent document 2: Japanese Laid-Open Patent Publication No. 2008-165161

SUMMARY OF THE INVENTION

Problem to be Solved by the Invention

However, in the overlapped image output mode, as depicted in FIG. 7(d), multi-speed drive in the backlight scanning causes the same frame image A and the same frame image B to be each displayed twice, which poses a problem that multi-contour created on the visually recognized image F5 recognized by a person deteriorate, compared to a case of the interpolation image insertion mode.

The present invention was conceived in view of the above circumstances, and it is therefore the purpose of the present invention to provide a liquid crystal display device that changes the contents of a backlight scanning depending on an executed multi-speed drive mode to be able to suppress the creation of multi-contour in displaying moving images as much as possible.

Means for Solving the Problem

In order to achieve the above purpose, the present invention is applied to a liquid crystal display device including an image writing portion that writes an image signal onto a liquid crystal panel in accordance with a given clock signal, a backlight source having a plurality of sub-light-sources arranged in rows in correspondence to a plurality of display areas in the vertical direction of the liquid crystal panel, a backlight control portion that executes a backlight scanning that causes each of the sub-light-sources to sequentially and repeatedly execute an intermittent turning-on action consisting of an action of a given consecutive turning-off period and an action of a given consecutive turning-on period in connection with an image signal writing action by the image signal writing portion, and an interpolation image generating portion that generates an interpolation image signal based on two or more consecutive frame images.

In the liquid crystal display device according to the present invention, when the image writing portion writes the image signal onto the liquid crystal panel in synchronization with a vertical synchronization signal having a frequency n times (n represents an integer of 2 or larger one) the frame frequency of an audio signal containing the image signal, the image writing portion executes a first multi-speed drive mode in which the interpolation image signal generated by the interpolation image generating portion is inserted between frames and is written onto the liquid crystal panel, or a second multi-speed drive mode in which the same frame image is written onto the liquid crystal panel n times in a row; and the backlight control portion matches the execution cycle of the intermittent turning-on action in the backlight scanning to the cycle of the vertical synchronization signal when the image writing portion executes the first multi-speed drive mode, while increases the execution cycle of the intermittent turning-on action in the backlight scanning to a cycle longer than the cycle of the synchronization signal or invalidates the backlight scanning when the image writing portion executes the second multi-speed drive mode.

According to the present invention, the contents of the backlight scanning is changed properly depending on which of the first multi-speed drive mode and the second multi-speed drive mode is executed. As a result, smooth moving image display can be realized as the creation of motion blur or multi-contour in displaying moving images is suppressed in the first multi-speed mode, and the creation of multi-contour in displaying moving images can be suppressed as much as possible also in the second multi-speed mode.

Specifically, it is conceived that when the image writing portion executes the second multi-speed drive mode, the backlight control portion may determine the execution cycle of the intermittent turning-on action in the backlight scanning to be n times the cycle of the vertical synchronization signal.

It is also conceived that when the image writing portion executes the second multi-speed drive mode, the backlight control portion may so shorten the execution cycle of the intermittent turning-on action in the backlight scanning that the backlight scanning is invalidated substantially. This is because that executing the intermittent turning-on action at a frequency high enough to substantially invalidate the backlight scanning suppresses the creation of multi-contour recognized by a person in moving image display.

It is preferable that the backlight control portion keeps a turning-on ratio in n frames in the backlight scanning constant. This prevents a change in the display luminance of the liquid crystal panel that is caused by switchover between the first multi-speed drive mode and the second multi-speed drive mode. It is obvious that a turning-on ratio in n frames when the backlight scanning is invalidated to keep the backlight source constantly turned on does not match a turning-on ratio when the backlight scanning is executed.

When the image writing portion executes the first multi-speed drive mode, if the precision of an interpolation image signal generated by the interpolation image generating portion is low, matching the execution cycle of the intermittent turning-on action in the backlight scanning to the cycle of the vertical synchronization signal may exert a negative effect on motion blur in video display.

It is conceived that the liquid crystal display device may further include an interpolation image precision determining portion that determines whether the precision of an interpolation image signal generated by the interpolation image generating portion is equivalent to preset precision. Specifically, it is conceived that when the interpolation image generating portion generates candidates for an interpolation image signal in the number equal to or greater than the preset number of candidates, the interpolation image precision determining portion may determine the precision of the interpolation image signal to be not equivalent to the preset precision.

Even when the image writing portion executes the first multi-speed drive mode, if the interpolation image precision determining portion determines the precision of the interpolation image signal to be not equivalent to the preset precision, the backlight control portion increases the execution cycle of the intermittent turning-on action in the backlight scanning to a cycle longer than the cycle of the vertical synchronization signal or invalidates the backlight scanning.

According to these configurations, when the precision of an interpolation image signal generated by the interpolation image generating portion is not equivalent to preset precision, a negative effect on motion blur exerted by the backlight scanning can be suppressed.

Effect of the Invention

According to the present invention, the contents of the backlight scanning is changed properly depending on which of the first multi-speed drive mode and the second multi-speed drive mode is executed. As a result, smooth moving image display can be realized as the creation of motion blur or multi-contour in displaying moving images is suppressed in the first multi-speed mode, and the creation of multi-contour in displaying moving images can be suppressed as much as possible also in the second multi-speed mode.

BRIEF DESCRIPTION OF DRAWINGS

FIG. 9 is a diagrammatical view for explaining the result of execution of the backlight scanning in a conventional overlapped image output mode.

MODES FOR CARRYING OUT THE INVENTION

An embodiment of the present invention will now be described with reference to the accompanying drawings to facilitate understanding of the present invention. The following embodiment is an example of embodiment of the present invention, and has no features that limit the technical scope of the present invention.

Figure 1:
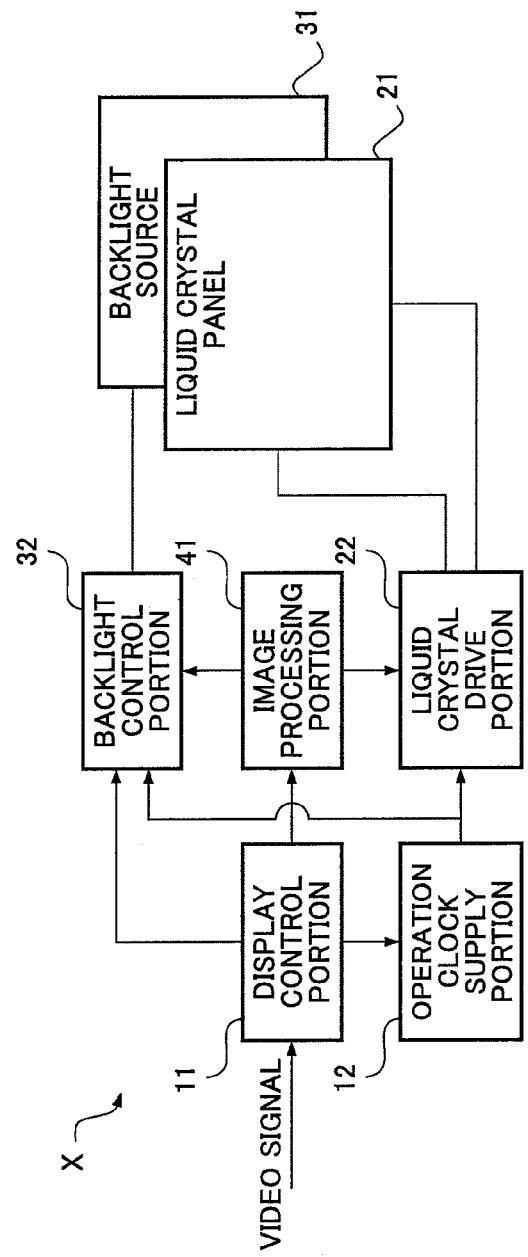
FIG. 1 is a block diagram of a schematic configuration of a liquid crystal display device according to an embodiment of the present invention.

As depicted in FIG. 1, a liquid crystal display device X according to the embodiment of the present invention includes a display control portion 11, an operation clock supply portion 12, a liquid crystal panel 21, a liquid crystal drive portion 22, a backlight source 31, a backlight control portion 32 (an example of a backlight control portion), and an image processing portion 41. The display control portion 11 may also serve as a main control portion that comprehensively controls the liquid crystal display device X.

The liquid crystal display device X is used as, for example, a display device incorporated in a TV set, PC, etc. In this embodiment, explanation of components (tuner, speaker, etc.) included in common TV sets and display devices that do not have a direct effect on the present invention will be omitted.

The liquid crystal panel 21 is composed of a liquid crystal layer, and scanning electrodes and data electrodes for applying scanning signals and data signals to the liquid crystal layer. The liquid crystal panel 21 is a known active matrix liquid crystal panel having a plurality of liquid crystal elements whose permeability changes depending on an applied voltage.

The liquid crystal drive portion 22 drives a scanning electrode (gate electrode) and a data electrode (source electrode) of the liquid crystal panel 21 in synchronization with an input vertical synchronization signal and an input horizontal synchronization signal, thereby writes an image signal onto the liquid crystal panel 21 to cause it to display an image. In this embodiment, the liquid crystal drive portion 22 and the image processing portion 41 are equivalent to an example of an image writing portion.

The operation clock supply portion 12 has a clock generator, etc., that generates a high-frequency clock signal, and supplies a clock signal (an example of a given clock signal, which will hereinafter be referred to as "operation clock") to the liquid crystal drive portion 22 and to the backlight control portion 32.

Hence liquid crystal drive portion 22 executes an operation of writing an image signal onto the liquid crystal panel 21 in accordance with the operation clock, which portion that the speed of writing the image signal onto the liquid crystal panel 21 by the liquid crystal drive portion 22 depends on the frequency of the operation clock. When the backlight control portion 32 executes a backlight scanning, which will be described later, the backlight control portion 32 executes the backlight scanning in accordance with the operation clock.

The operation clock supply portion 12 is able to change the frequency of the operation clock in accordance with a control instruction from the display control portion 11.

For example, the operation clock supply portion 12 has a frequency-dividing circuit capable of frequency dividing a reference clock signal output from the clock generator at an arbitrary frequency-dividing ratio. It is thus conceived that the operation clock supply portion 12 may change the frequency-dividing ratio of the frequency-dividing circuit in accordance with a control instruction from the display control portion 11 to output an operation clock signal of a given frequency. The operation clock supply portion 12 may adopt other known methods of frequency division by which a plurality of types of operation clocks of different frequencies can be selectively output.

In this embodiment, the operation clock supply portion 12 outputs at least either of operation clocks of different frequencies f11 and f12 in accordance with an instruction from the display control portion 11. It is obvious that the operation clock supply portion 12 may be able to output a multiple of types of operation clocks of different frequencies.

The frequency f11 is a frequency value that is set in advance so that the sum of a time required for writing an image signal for one frame onto the liquid crystal panel 21 and retrace line periods assigned before and after the time for writing the image signal is equal to the frame cycle of a video signal input to the liquid crystal display device X.

The frequency f12 is at least higher than the frequency f11. In this embodiment, the frequency f12 is twice (an example of n times) the frequency f11. When the frequency f12 is output from the operation clock supply portion 12, therefore, the liquid crystal drive portion 22 carries out an operation of image signal writing twice as fast as an operation of image signal writing that is carried out when the frequency f11 is output.

The display control portion 11 receives a video signal included in television broadcasting waves received by an antenna (not depicted), video contents input through an external input terminal (not depicted), etc., and generates a vertical synchronization signal and a horizontal synchronization signal based on the video signal. For example, the display control portion 11 has a frequency divider that frequency divides an incoming clock signal of a prescribed frequency from a clock generator (not depicted) to give the clock signal an arbitrary frequency.

Specifically, the display control portion 11 generates a vertical synchronization signal having a frequency of 120 Hz twice as high as 60 Hz that is the frame rate of a video signal included in television broadcasting waves, etc. The display control portion 11 also generates a horizontal synchronization signal having a frequency of, for example, approximately several score to several hundred kHz, depending on the frequency of the vertical synchronization signal and the size and resolution (number of pixels) of the liquid crystal panel 21.

The display control portion 11 may be able to generate a vertical synchronization signal having a frequency n times (n represents an integer of 2 or larger one) the frame frequency of an input video signal, such as a signal having a frequency of 180 Hz, 240 Hz, 480 Hz, etc. It is also conceived that the display control portion 11 may automatically change the frequencies of a vertical synchronization signal and a horizontal synchronization signal to be generated, depending on, for example, a user's operation of a remote controller (not depicted) or operation keys provided on the body of the liquid crystal display device X or on the contents of displayed video.

The display control portion 11 inputs the video signal, the vertical synchronization signal, and the horizontal synchronization signal to the image processing portion 41.

The image processing portion 41 executes a frame insertion process of inserting an image between frames of the image signal input from the display control portion 11, thereby causes the liquid crystal panel 21 to display an image at a frequency of 120 Hz (i.e., 120 frames per second) twice the frame frequency of the video signal in synchronization with the vertical synchronization signal.

At this time, when carrying out the frame insertion process, the image processing portion 41 executes an interpolation image insertion mode (equivalent to a first multi-speed drive mode) in which an interpolation image signal generated based on two or more consecutive frame images is inserted between frames and is written onto the liquid crystal panel or an overlapped image output mode (equivalent to a second multi-speed drive mode) in which the same frame image is written onto the liquid crystal panel two times in a row.

In the interpolation image insertion mode, the image processing portion 41 generates an interpolation image signal to be inserted between frames, based on image signals for two or more consecutive frame images. A method of generating the interpolation image signal is provided as an application of various known techniques, such as a technique of carrying out image interpolation based on motion vectors between preceding and following frames, and is, therefore, omitted in further description. The image processing portion 41 that executes the process of generating the interpolation image signal is equivalent to an interpolation image generating means portion.

The image processing portion 41 inputs a signal created by synthesizing the image signal and the interpolation image signal, together with the vertical synchronization signal and the horizontal synchronization signal, to the liquid crystal drive portion 22, and inputs the vertical synchronization signal and the horizontal synchronization signal to the backlight control portion 32.

In the interpolation image insertion mode, the interpolation image signal cannot be generated in some cases in which motion vectors between frames cannot be generated normally due to the complicated patterns, designs, etc., of frame images. It is conceivable in such a case that a twofold-speed drive mode in which the liquid crystal panel 21 displays an image at the frequency of 120 Hz twice the frame frequency may be switched over to a unit-speed drive mode in which the liquid crystal panel 21 displays an image at the frame frequency of 60 Hz. When the twofold-speed drive mode and the unit-speed drive mode are switched over to each other, however, the liquid crystal drive portion 22 that controls the liquid crystal panel 21 must be reset, in which case an image displayed on the liquid crystal panel 21 is disturbed when the liquid crystal drive portion 22 is reset. Hence the overlapped image output mode is used to prevent the disturbance of the displayed mage and improve video quality even when the interpolation image signal cannot be generated.

In the overlapped image output mode, the image processing portion 41 inputs an image signal for the same frame image, together with the vertical synchronization signal and the horizontal synchronization signal, to the liquid crystal drive portion 22 two times in a row in every cycle, and inputs the vertical synchronization signal and the horizontal synchronization signal to the backlight control portion 32. In this case, because the frequency of the vertical synchronization signal is twice the frame frequency of the image signal, the same frame image is output two times in a row. However, when the frequency of the vertical synchronization signal is n times (n represents an integer of 2 or larger one) the frame frequency of the video signal, the same frame image is output n times in a row.

In the overlapped image output mode, the image signals for the same frame image are displayed two times in a row in every cycle, so that the drive mode becomes substantially equal to the unit-speed drive mode in which an image is displayed on the liquid crystal panel 21 at the frame frequency of 60 Hz. As a result, when an intermittent turning-on action in the backlight scanning is carried out at 120 Hz, the same image is displayed twice. This leads to a problem of double contour. The liquid crystal display device X according to the embodiment of the present invention is characterized in that it provides a solution to such a problem, as described below.

The image processing portion 41 has an interpolation image failure detecting function of determining whether an interpolation image has failed or not, that is, whether an interpolation image has been generated normally or not in the interpolation image insertion mode of the frame insertion process. The interpolation image failure detecting function is exerted to detect a failure of an interpolation image, for example, when motion vectors between consecutive two frames cannot be converged into one interpolation image.

When the frequency of the vertical synchronization signal is twice the frame frequency of the video signal, the image processing portion 41, in principle, executes the interpolation image insertion mode. When a failure of an interpolation image is detected by the interpolation image failure detecting function during execution of the interpolation image insertion mode, however, the image processing portion 41 executes the overlapped image output mode. This prevents the disturbance of video caused by a failure of the interpolation image. The image processing portion 41 carries out switchover between the interpolation image insertion mode and the overlapped image output mode frame by frame in video signals. As mentioned before, drive mode switchover between the twofold speed drive mode and the unit-speed drive mode requires resetting the liquid crystal drive portion 22. This resetting causes a disturbance on a displayed image on the liquid crystal panel 21. For this reason, when detecting a failure of an interpolation image, the image processing portion 41 switches not to the unit-speed drive mode but to the overlapped image output mode.

At this time, the image processing portion 41 informs the backlight control portion 32 of which of the interpolation image insertion mode and the overlapped image output mode is executed in the frame insertion process. A detection circuit may be provided as a circuit that determines whether the same frame image is consecutively output several times, based on an image signal output from the image processing portion 41, to determine which of the interpolation image insertion mode and the overlapped image output mode is executed. In this configuration, the detection circuit communicates its detection result to the backlight control portion 32.

It may be switched by the display control portion 11 depending on, for example, the user's operation of a remote controller (not depicted) or operation keys provided on the body of the liquid crystal display device X that which of the interpolation image insertion mode and the overlapped image output mode is executed by the image processing portion 41 in the frame insertion processing. The display control portion 11 may automatically determine in mode switchover which of the interpolation image insertion mode and the overlapped image output mode is to be executed, depending on the contents of displayed video, etc.

Figure 2:
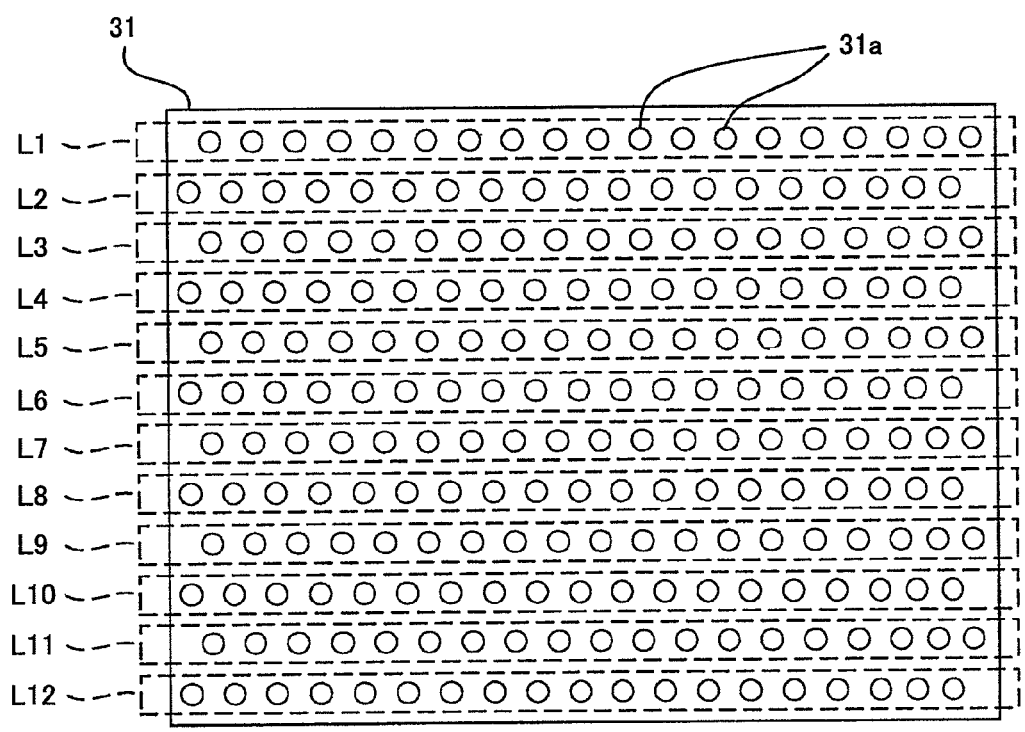
FIG. 2 is a diagrammatical view of an example of a backlight source incorporated in the liquid crystal display device according to the embodiment of the present invention.

The backlight source 31 is disposed on the back of the liquid crystal panel 21 and illuminates the liquid crystal panel 21 from its back. FIG. 2 is a diagrammatical view of an example of the structure of the backlight source 31.

As depicted in FIG. 2, the backlight source 31 has a plurality of LED light source groups L1 to L12 (an example of a plurality of light sources) arranged in rows in correspondence to a plurality of display areas in the vertical direction of the liquid crystal panel 21. Each of the LED light source groups L1 to L12 includes a plurality of LED light sources 31a arranged in rows in the horizontal direction of the liquid crystal panel 21. Each of the display areas corresponding to each of the LED light source groups L1 to L12 is an area including display pixels in several lines of the liquid crystal panel 21.

The backlight source 31 separately turns on a multiplicity of the LED light sources 31a in units of each group of the LED light source groups L1 to L12. The number of the LED light source groups L1 to L12 is not limited to 12, but may be changed depending on the size of the liquid crystal panel 21. The backlight source 31 may have a plurality of fluorescent tubes (an example of a plurality of light sources) arranged in rows in the vertical direction of the liquid crystal panel 21, in place of the LED light source groups L1 to L12.

The backlight control portion 32 is capable of selectively executing either a hold-type drive process of constantly turning on the backlight source 31 or a backlight scanning (pseudo impulse drive) of causing each of the LED light source groups L1 to L12 to sequentially and repeatedly execute an intermittent turning-on action consisting of an action of a given consecutive turning-off period and an action of a given consecutive turning-on period in connection with an image signal writing action by the liquid crystal drive portion 22.

Execution or non-execution of the backlight scanning by the backlight control portion 32 is determined by the display control portion 11, depending in principle on the user's operation of a remote controller (not depicted) or operation keys provided on the body of the liquid crystal display device X. The display control portion 11 may automatically determine execution or non-execution of the backlight scanning depending on the contents of displayed video. For example, when animation, in which the same image is displayed in every two frames, or 24 frames/sec. progressive video, such as motion pictures in which 24 frame images are displayed in 1 second, are broadcasted at a frame frequency of 60 Hz, the same image is displayed in consecutive 2 frames at a given cycle. It is highly likely in this case that an interpolation image is not generated correctly. For this reason, when displayed video is animation or 24 frames/sec. progressive video, execution of the backlight scanning may be automatically suspended.

According to the liquid crystal display device X according to the embodiment of the present invention, the backlight control portion 32 changes the contents of the backlight scanning depending on which of the interpolation image insertion mode and the overlapped image output mode is executed by the image processing portion 41.

Examples of operations by the liquid crystal display device X will hereinafter be described with reference to diagrammatical views of FIGS. 3 and 4.

(Interpolation Image Insertion Mode)

A case of the image processing portion 41 executing the interpolation image insertion mode in the frame insertion process will be described with reference to FIG. 3. FIG. 3(a) depicts a vertical synchronization signal, FIG. 3(b) depicts an image signal, FIG. 3(c) depicts an interpolation image signal, and FIG. 3(d) depicts an action by the backlight source 31.

Figure 3:
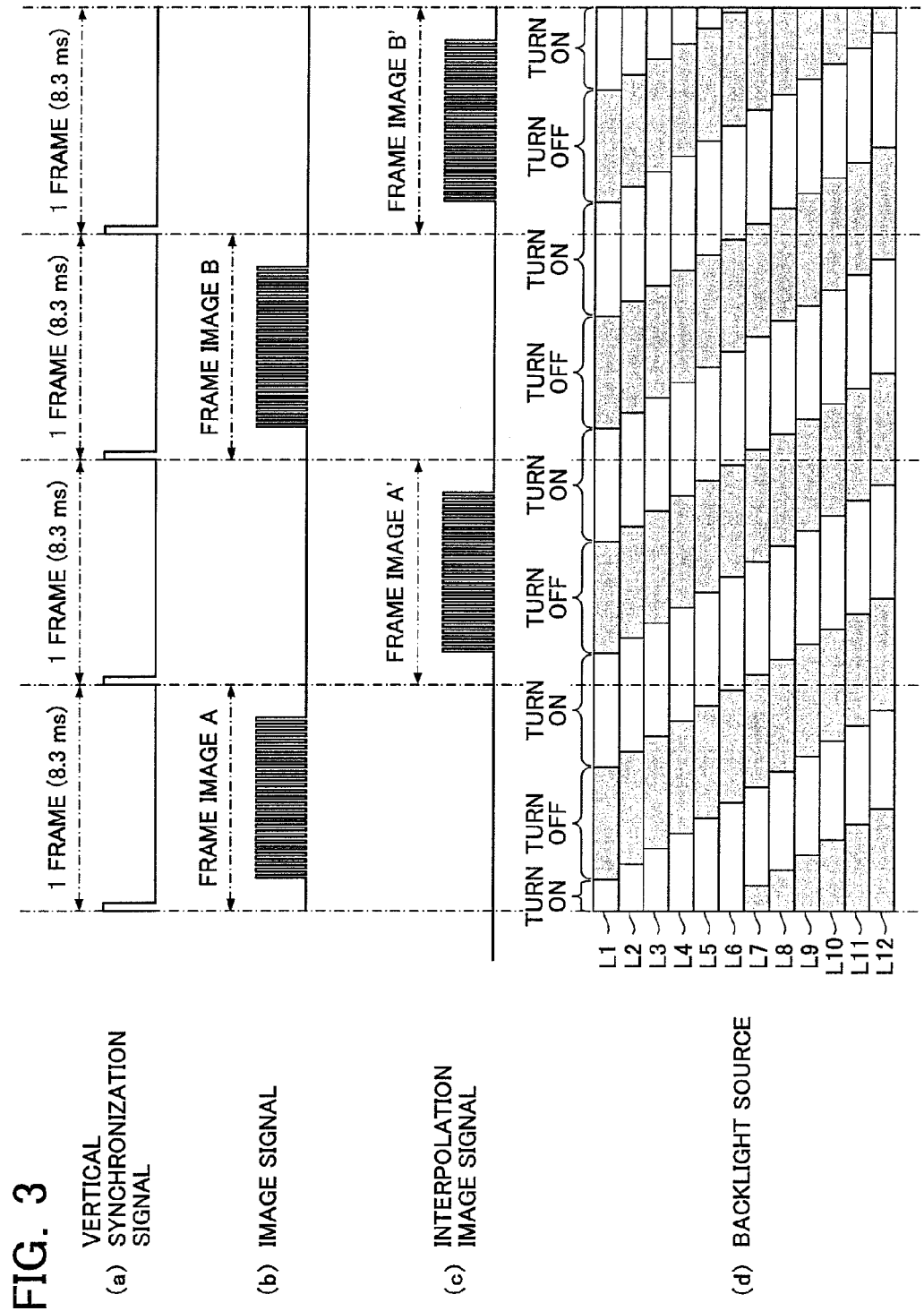
FIG. 3 is an explanatory diagram of an example of an operation by the liquid crystal display device according to the embodiment of the present invention.
Figure 4:
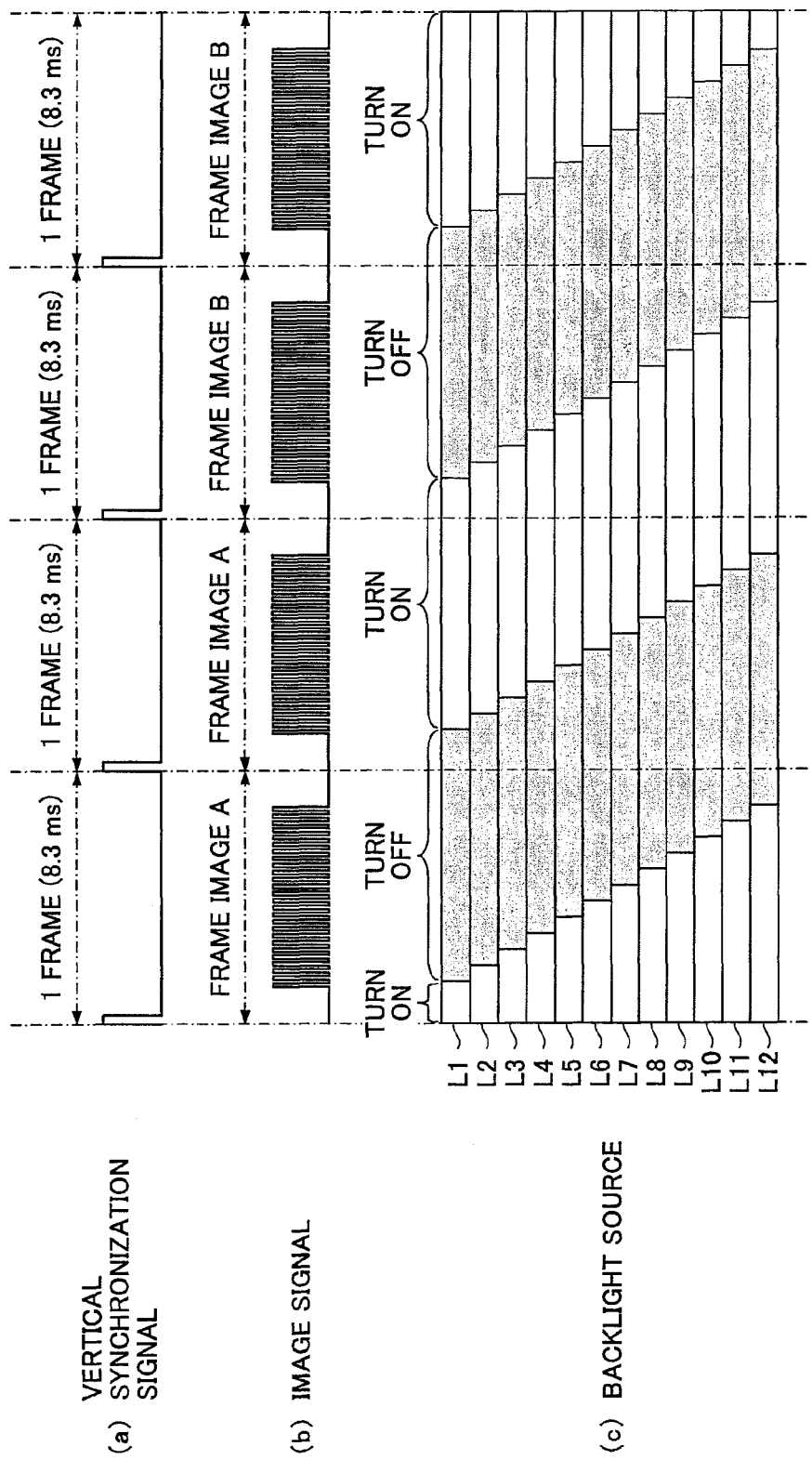
FIG. 4 is an explanatory diagram of an example of an operation by the liquid crystal display device according to the embodiment of the present invention.

As depicted in FIG. 3, when the interpolation image insertion mode is executed, the display control portion 11 generates a vertical synchronization signal having a frequency of 120 Hz (1 frame in about 8.3 ms) twice as high as 60 Hz that is the frame frequency of a video signal input to the display control portion 11 (see FIG. 3(a)), and a horizontal synchronization signal having the frequency corresponding to that of the vertical synchronization signal. The display control portion 11 then inputs the image signal, together with the vertical synchronization signal and the horizontal synchronization signal, to the image processing portion 41. The display control portion 11 gives a control instruction to the operation clock supply portion 12 to instruct it to input an operation clock having the frequency f12 twice the frame frequency of the video signal, to the liquid crystal drive portion 22 and to the backlight control portion 32.

The image processing portion 41 generates an interpolation image based on the image signal, and inserts the interpolation image between frame images. When detecting a failure in normally generating the interpolation image, the image processing portion 41 suspends the interpolation image insertion mode and executes the overlapped image output mode.

When succeeding in normally generating the interpolation image, the image processing portion 41 inputs the image signal and the interpolation image signal, together with the vertical synchronization signal and the horizontal synchronization signal, to the liquid crystal drive portion 22.

Hence the liquid crystal drive portion 22 writes the image signal and the interpolation image signal onto the liquid crystal panel 21 in synchronization with the vertical synchronization signal and the horizontal synchronization signal (see FIGS. 3(b) and 3(c)). For example, as depicted in FIGS. 3(b) and 3(c), a frame image A', which is an interpolation image generated based on frame images A and B, is written in between the frame images A and B that are consecutive frame images in the input original video signal. Because the liquid crystal drive portion 22 carries out its image signal writing action in accordance with the operation clock having the frequency f12 supplied from the operation clock supply portion 12, a time for writing an image signal for 1 frame (image signal writing time+retrace line period) is the same as one cyclic interval of the vertical synchronization signal having the frequency of 120 Hz.

At this time, the image processing portion 41 informs the backlight control portion 32 that the interpolation image insertion mode is being executed.

Receiving the information that the interpolation image insertion mode is being executed, the backlight control portion 32 carries out a backlight scanning of causing each of the LED light source groups L1 to L12 to repeatedly and sequentially execute an intermittent turning-on action consisting of an action of a turning-off period of about 4.1 ms (an example of a given consecutive turning-off period) equivalent to 50% of the 1 frame period and an action of turning-on period of about 4.1 ms (an example of a given consecutive turning-on period) equivalent to 50% of the 1 frame period in connection with the image signal writing action by the liquid crystal drive portion (see FIG. 3(d)). The execution cycle (turning-on period+turning-off period) of the intermittent turning-on action in the backlight scanning, therefore, matches with the cycle of writing one frame image onto the liquid crystal panel 21 by the liquid crystal drive portion 22, i.e., the cycle of the vertical synchronization signal. The higher a turning-off period ratio (black insertion ratio) in one frame period is, the less the image persistence of displayed video is. For this reason, 50% of one frame period is assigned to the turning-off period. The turning-off period ratio is, however, not limited to 50%, but may be determined to be equal to or higher than 50%. The backlight control portion 32 may be allowed to change the turning-off period ratio (black insertion ratio) depending on user setting or video contents.

Hence the liquid crystal display device X is able to realize smooth moving image display while preventing motion blur and multi-contour in displaying moving images in the interpolation image insertion mode (see FIG. 7(c)).

(Overlapped Image Output Mode)

As described above, in the overlapped image output mode, an image signal for the same frame image is displayed two times in a row in every cycle, so that the drive mode becomes substantially equal to the unit-speed drive mode in which an image is displayed on the liquid crystal panel 21 at the frame frequency of 60 Hz. As a result, when the intermittent turning-on action in the backlight scanning is carried out at 120 Hz, the same image is displayed twice. This leads to a problem of double contour. For this reason, the liquid crystal display device X switches to the overlapped image output mode when a failure of the interpolation image is detected in the interpolation image insertion mode.

A case of the image processing portion 41 executing the overlapped image output mode in the frame insertion process will then be described with reference to FIG. 4. FIG. 4(a) depicts a vertical synchronization signal, FIG. 4(b) depicts an image signal, and FIG. 4(c) depicts an action by the backlight source 31. In the same manner as in the interpolation image insertion mode, the display control portion 11 inputs the image signal, together with the vertical synchronization signal of 120 Hz (see FIG. 4(a)) and the horizontal synchronization signal having the frequency corresponding to that of the vertical synchronization signal, to the image processing portion 41. The display control portion 11 gives a control instruction to the operation clock supply portion 12 to instruct it to input an operation clock having the frequency f12 twice the frame frequency of the video signal, to the liquid crystal drive portion 22 and to the backlight control portion 32.

The image processing portion 41 inputs an image signal for the same frame image, together with the vertical synchronization signal and the horizontal synchronization signal, to the liquid crystal drive portion 22 two times in a row in every cycle.

Hence the liquid crystal drive portion 22 writes the image signal onto the liquid crystal panel 21 in synchronization with the vertical synchronization signal and the horizontal synchronization signal (see FIG. 4(b)). For example, as depicted in FIG. 4(b), the frame image A is consecutively written to follow the same frame image A and, in the same manner, the frame image B is consecutively written to follow the same frame image B in the input original video signal. Because the liquid crystal drive portion 22 carries out its image signal writing action in accordance with the operation clock having the frequency f12 supplied from the operation clock supply portion 12, a time for writing an image signal for 1 frame (image signal writing time+retrace line period) is the same as one cyclic interval of the vertical synchronization signal having the frequency of 120 Hz.

At this time, the image processing portion 41 informs the backlight control portion 32 that the overlapped image output mode is being executed.

Receiving the information that the overlapped image output mode is being executed, the backlight control portion 32 carries out a backlight scanning of causing each of the LED light source groups L1 to L12 to repeatedly and sequentially execute an intermittent turning-on action consisting of an action of a turning-off period of about 8.3 ms (an example of a given consecutive turning-off period) equal to 1 frame period and an action of turning-on period of about 8.3 ms (an example of a given consecutive turning-on period) equal to 1 frame period in connection with the image signal writing action by the liquid crystal drive portion 22 (see FIG. 4(c)). The execution cycle (turning-on period+turning-off period) of the intermittent turning-on action in the backlight scanning is, therefore, equal to the frame cycle of the video signal input to the liquid crystal display device X, which means that the execution cycle is two times (an example of n times) the cycle of writing 1 frame image onto the liquid crystal panel 21 by the liquid crystal drive portion 22, that is, the cycle of the vertical synchronization signal.

As a result, in the overlapped image output mode, the liquid crystal display device X displays only the latter half of each image signal for each of the consecutive frame images A and B once at a time on the liquid crystal panel 21. This prevents intermittent display of the same frame image, thus suppresses multi-contour in displaying moving images. Specifically, as indicated in FIG. 7(b), multi-contour in displaying moving images is suppressed, compared to a case where in the overlapped image output mode, the intermittent turning-on action in the backlight scanning is carried out at the cycle equal to the cycle of writing 1 frame image onto the liquid crystal panel 21 (see FIG. 7(d)).

The backlight control portion 32 keeps a turning-on ratio in 2 frames (an example of n frames) in the intermittent turning-on action constant (50%) in the overlapped image output mode and the interpolation image insertion mode (see FIGS. 3(d) and 4(c)). This prevents a change in the display luminance of the liquid crystal panel 21 caused by switchover between the interpolation image insertion mode and the overlapped image output mode. The turning-on ratio in the intermittent turning-on action is not limited to 50% but can be changed properly. Since the same image is written twice onto the liquid crystal panel 21 in the overlapped image output mode, the backlight is turned on at the second time of image writing, which means that the backlight is caused to turn on after the completion of responses by the liquid crystal elements of the liquid crystal panel 21. Hence moving image quality is improved.

As described above, the liquid crystal display device X properly changes the contents of the backlight scanning depending on which of the interpolation image insertion mode (first multi-speed drive mode) and the overlapped image output mode (second multi-speed drive mode) is executed. As a result, smooth moving image display can be realized as the creation of motion blur or multi-contour in displaying moving images is suppressed in the interpolation image insertion mode, and the creation of multi-contour in displaying moving images can be suppressed as much as possible also in the overlapped image output mode.

Working Example 1

Other configuration examples of the liquid crystal display device X will hereinafter be described with reference to diagrammatical views of FIGS. 5 and 6.

The above embodiment is described as an example in which when the overlapped image output mode is executed, the execution cycle of the intermittent turning-on action in the backlight scanning is changed into a cycle longer than (twice) the cycle of vertical synchronization signal.

It is conceived in another working example that the backlight scanning may be invalidated in the overlapped image output mode.

Figure 5:
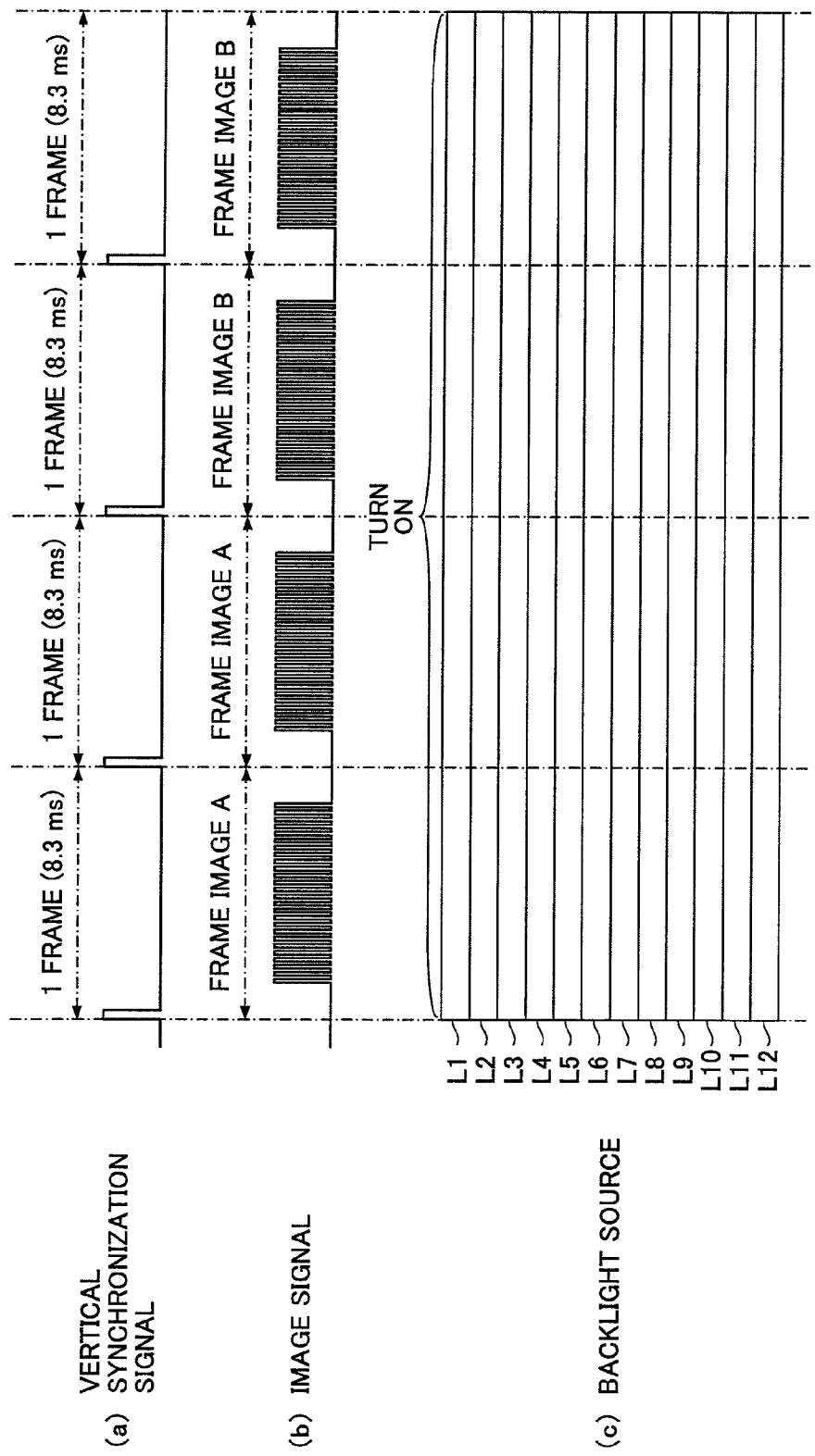
FIG. 5 is an explanatory diagram of an example of an operation by the liquid crystal display device according to the embodiment of the present invention.
Figure 7:
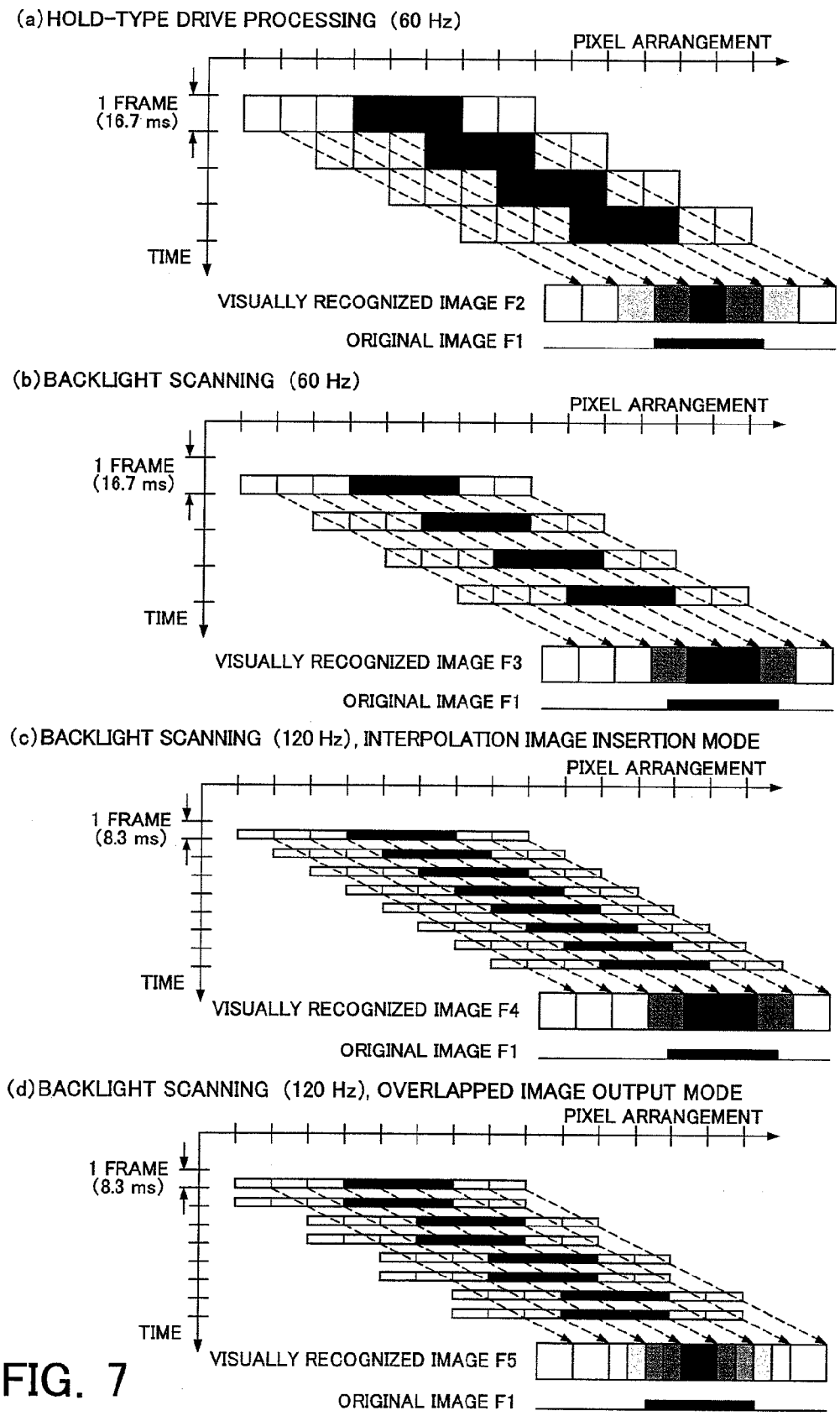
FIG. 7 is a diagrammatical view for explaining examples of relations between drive modes of the backlight source and moving image display.
Figure 8:
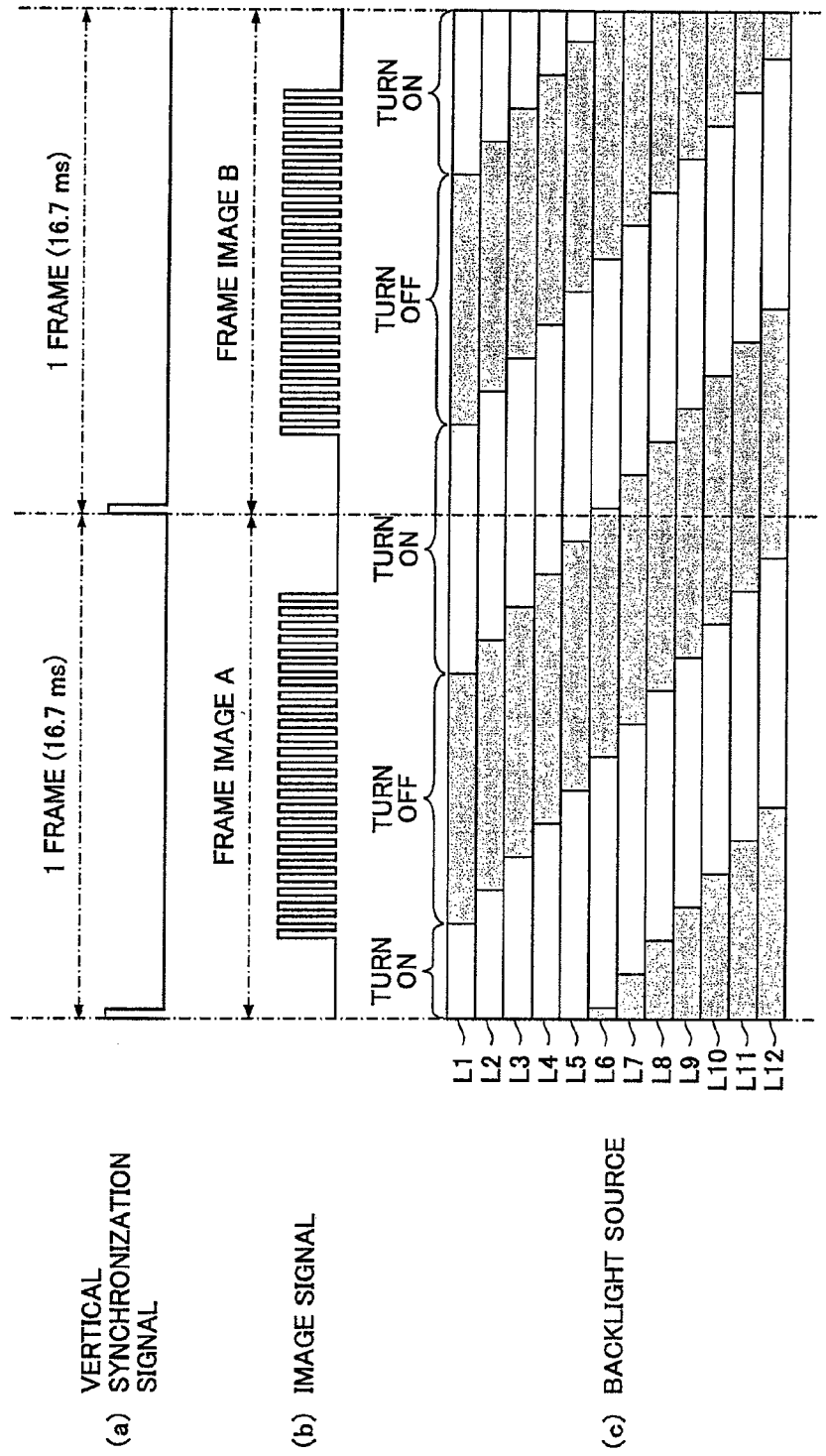
FIG. 8 is a diagrammatical view for explaining the result of execution of an ordinary backlight scanning.

Specifically, when the overlapped image output mode is executed, the backlight control portion 32 may suspend the backlight scanning and execute a hold-type drive process of constantly turning on the backlight source 31, as depicted in FIG. 5. As a result, as indicated in FIG. 7(*a*), multi-contour are prevented, which multi-contour are created when the intermittent turning-on action in the backlight scanning is carried out at the same cycle as the cycle of writing 1 frame image onto the liquid crystal panel 21 in the overlapped image output mode (see FIG. 7(*d*)).

A method of invalidating the backlight scanning by the backlight control portion 32 is not limited to suspension of the backlight scanning. Another conceivable method is to substantially invalidate the backlight scanning by extremely shortening the execution cycle of the intermittent turning-on action in the backlight scanning.

Figure 6:
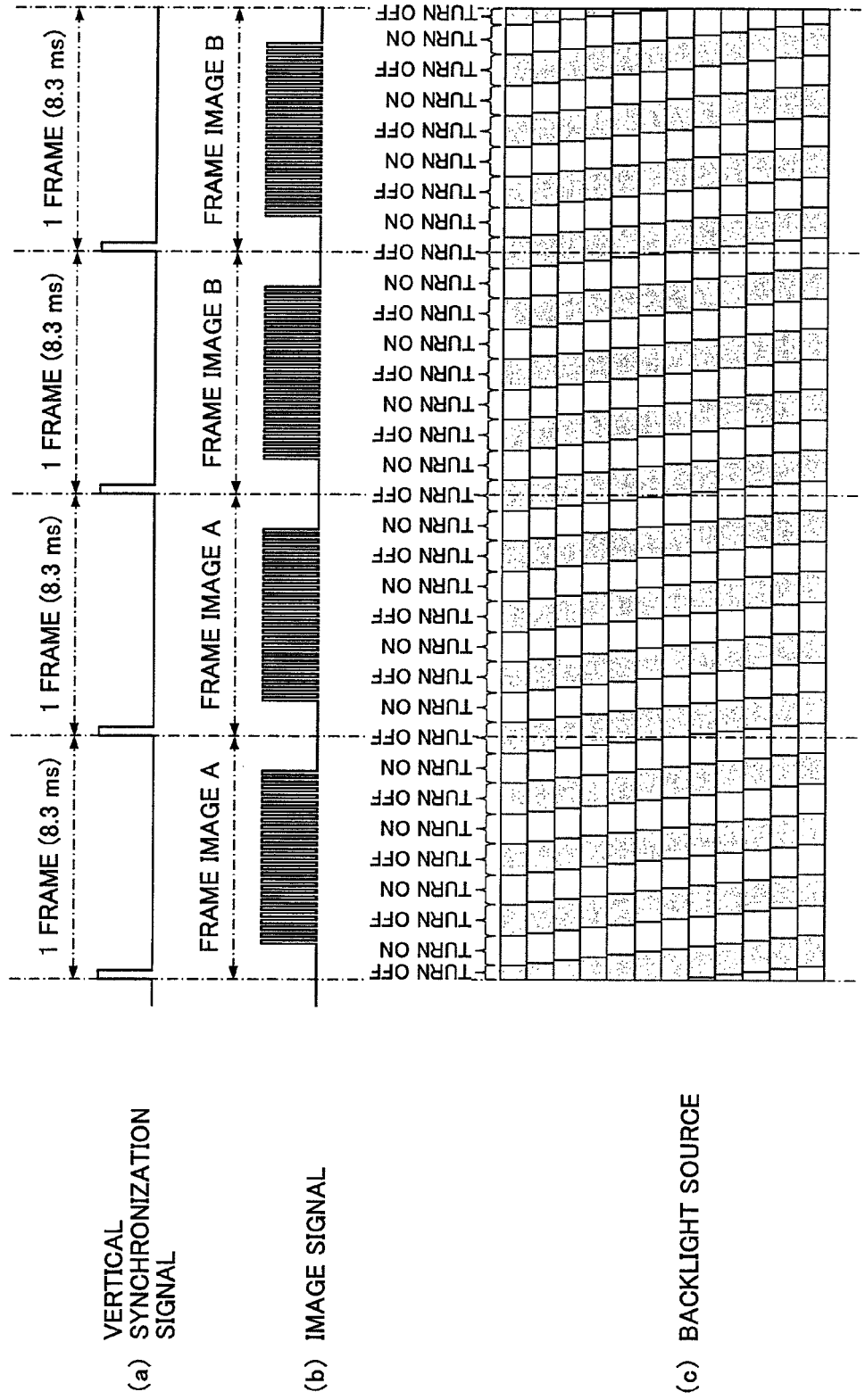
FIG. 6 is an explanatory diagram of an example of an operation by the liquid crystal display device according to the embodiment of the present invention.

For example, FIG. 6 depicts an example in which the backlight scanning is substantially invalidated by determining the execution frequency of the intermittent turning-on action in the backlight scanning to be 480 Hz when the frame frequency of an input video signal is 60 Hz and the frequency of the vertical synchronization signal is 120 Hz. In this case, the backlight control portion 32 cancels the state of connection between the action of image signal writing by the liquid crystal drive portion 22 and the backlight scanning, and executes the backlight scanning as an independent process. In this manner, multi-contour in displaying moving images can be suppressed by substantially invalidating the backlight scanning.

Specifically, it is conceived that based on a control instruction from the display control portion 11, the clock supply portion 12 may change only the frequency of an operation clock to be input to the backlight control portion 32 into a frequency of 480 Hz sufficiently higher than the frequency of 120 Hz of the vertical synchronization signal. As a result, the backlight control portion 32 controls turning on and off of each of the LED light source groups L1 to L12 of the backlight source 31 to cause the LED light source groups L1 to L12 to execute the intermittent turning-on action at the execution frequency of 480 Hz. The changed operation clock frequency is not limited to 480 Hz, but may be a frequency that is high enough to substantially invalidate the backlight scanning.

It is conceived even in such a case that the backlight control portion 32 may keep a turning-on ratio at the intermittent turning-on action in the backlight scanning identical with a turning-on ratio in the interpolation image insertion mode, thus maintain a uniform display luminance.

Working Example 2

The above embodiment is described as an example in which upon detecting a failure in normally generating the interpolation image when the interpolation image insertion mode is executed, the image processing portion 41 suspends the interpolation image insertion mode and executes the overlapped image output mode. When the interpolation image is generated normally, the execution cycle (turning-on period+turning-off period) of the intermittent turning-on action in the backlight scanning matches the cycle of writing 1 frame onto the liquid crystal panel 21 by the liquid crystal drive portion 22, that is, the cycle of the vertical synchronization signal.

In a working example 2, a modification of the process carried out in the interpolation image insertion mode is described.

Specifically, when the interpolation image insertion mode is executed by the liquid crystal drive portion 22 and the image processing portion 41, if the precision of an interpolation image signal generated by the image processing portion 41 is low, the backlight scanning may exert a negative effect on motion blur. Particularly, if the execution cycle (turning-on period+turning-off period) of the intermittent action in the backlight scanning matches the cycle of writing 1 frame onto the liquid crystal panel 21 by the liquid crystal drive portion 22, that is, the cycle of the vertical synchronization signal when the precision of the interpolation image signal is low, it exerts a negative effect on motion blur in displaying moving images.

It is conceived that the image processing portion 41 may have an interpolation image precision determining function of determining whether the precision of an interpolation image signal generated by the image processing portion 41 is equivalent to preset precision and change the contents of the backlight scanning in accordance with the result of determination by the function. The image processing portion 41 that embodies the interpolation image precision determining function is equivalent to an interpolation image precision determining portion.

For example, it is conceived that when the image processing portion 41 generates candidates for an interpolation image signal in the number equal to or greater than the preset number of candidates, the image processing portion 41 may determine the precision of the interpolation image signal to be not equivalent to the preset precision. If a multiplicity of different motion vectors are assumed when an interpolation image signal is generated based on two or more consecutive frame images, the precision of the interpolation image signal generated based on the motion vectors is considered to be low.

It is conceived that, for example, when only one candidate for the interpolation image signal is generated, the image processing portion 41 may determine that the precision of the interpolation image signal is high enough to be equivalent to the preset precision, and when two or more candidates for the interpolation image signal are generated, the image processing portion 41 may determine that the precision of the interpolation image signal is so low as not to be equivalent to the preset precision.

This is not the only method of determining the precision of the interpolation image signal. A determination on the precision may be made based on a given index that enables a determination on whether the precision of the interpolation image signal is equivalent to the preset precision (e.g., result of an image comparison process of comparing the adopted interpolation image signal with frame images preceding and following the interpolation image).

Even when the liquid crystal drive portion 22 and the image processing portion 41 execute the interpolation image insertion mode, if the image processing portion 41 determines the precision of the interpolation image signal to be not equivalent to the preset precision, the backlight control portion 32 increases the execution cycle of the intermittent turning-on action of in the backlight scanning to a cycle longer than the cycle of the vertical synchronization signal or invalidates the backlight scanning. When the image processing portion 41 determines the precision of the interpolation image signal to be equivalent to the preset precision, the execution cycle (turning-on period+turning-off period) of the intermittent action in the backlight scanning matches the cycle of writing 1 frame onto the liquid crystal panel 21 by the liquid crystal drive portion 22, that is, the cycle of the vertical synchronization signal.

According to such a configuration, when the precision of an interpolation image signal generated by the image processing portion 41 is not equivalent to preset precision, a negative effect on motion blur due to the backlight scanning can be suppressed.

INDUSTRIAL APPLICABILITY

The present invention can be applied to liquid crystal display devices, such as a TV set and display device.

EXPLANATION OF LETTERS AND NUMERALS

11 . . . display control portion
21 . . . liquid crystal panel
22 . . . liquid crystal drive portion
31 . . . backlight source
32 . . . backlight control portion
31a . . . LED light source
41 . . . image processing portion
L1 to L12 . . . LED light source groups
X . . . liquid crystal display device

The invention claimed is:

1. A liquid crystal display device comprising:
an image writing portion that writes an image signal onto a liquid crystal panel in accordance with a given clock signal;
a backlight source having a plurality of sub-light-sources arranged in rows in correspondence to a plurality of display areas in a vertical direction of the liquid crystal panel;
a backlight control portion that executes a backlight scanning that causes each of the sub-light-sources to sequentially and repeatedly execute an intermittent turning-on action consisting of an action of a given consecutive turning-off period and an action of a given consecutive turning-on period in connection with an image signal writing action by the image signal writing portion; and
an interpolation image generating portion that generates an interpolation image signal based on two or more consecutive frame images, wherein
the image writing portion writing an image signal onto the liquid crystal panel in synchronization with a vertical synchronization signal having a frequency n times (n represents an integer of 2 or larger one) a frame frequency of a video signal containing the image signal, the image writing portion, when in a first multi-speed drive mode, executing an interpolation image insertion process in which the interpolation image signal generated by the interpolation image generating portion is inserted between frames and is written onto the liquid crystal panel, and, when in a second multi-speed drive mode, the image writing portion executing an overlapped image output process in which the same frame image is written onto the liquid crystal panel n times in a row, and wherein
the backlight control portion matches an execution cycle of the intermittent turning-on action in the backlight scanning to a cycle of the vertical synchronization signal when the image writing portion executes the first multi-speed drive mode, while increasing the execution cycle of the intermittent turning-on action in the backlight scanning to a cycle longer than the cycle of the vertical synchronization signal or invalidates the backlight scanning when the image writing portion executes the second multi-speed drive mode;
an interpolation image precision determining portion that determines whether precision of an interpolation image signal generated by the interpolation image generating portion is equivalent to preset precision, wherein
even when the image writing portion executes the first multi-speed drive mode, if the interpolation image precision determining portion determines the precision of the interpolation image signal to be not equivalent to the preset precision, the backlight control portion increases an execution cycle of the intermittent turning-on action in the backlight scanning to a cycle longer than a cycle of the vertical synchronization signal or invalidates the backlight scanning.

2. The liquid crystal display device as defined in claim 1, wherein
when the image writing portion executes the second multi-speed drive mode, the backlight control portion determines an execution cycle of the intermittent turning-on action in the backlight scanning to be n times a cycle of the vertical synchronization signal.

3. The liquid crystal display device as defined in claim 1, wherein
when the image writing portion executes the second multi-speed drive mode, the backlight control portion so shortens an execution cycle of the intermittent turning-on action in the backlight scanning that the backlight scanning is invalidated substantially.

4. The liquid crystal display device as defined in claim 2 or 3, wherein
the backlight control portion keeps a turning-on ratio in n frames in the backlight scanning constant.

5. The liquid crystal display device as defined in claim 1, wherein
when the interpolation image generating portion generates candidates for an interpolation image signal in number equal to or greater than preset number of candidates, the interpolation image precision determining portion determines precision of the interpolation image signal to be not equivalent to the preset precision.

* * * * *